G. Sewell,
Hose Coupling.
No. 99,715. Patented Feb. 8, 1870.
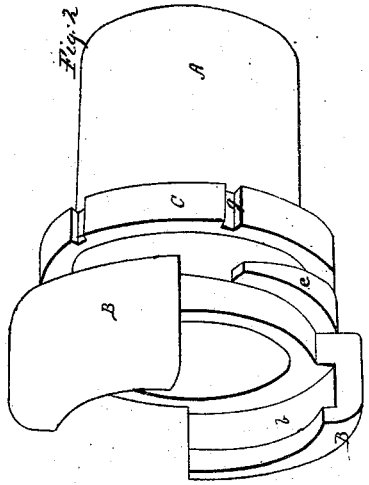
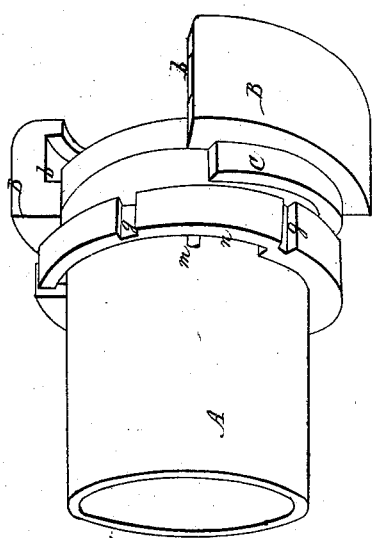
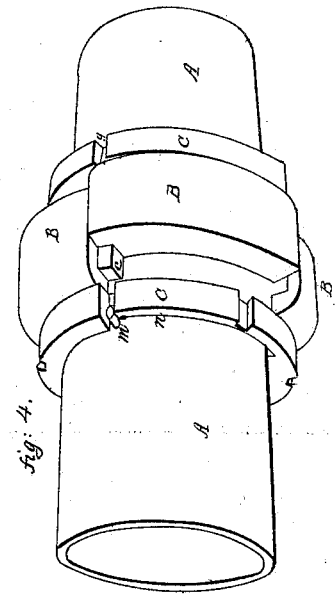
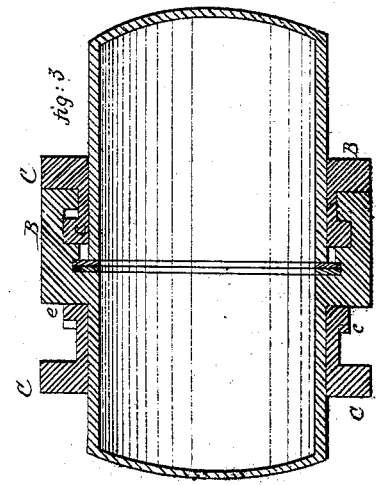

United States Patent Office.

GEORGE SEWELL, OF BROOKLYN, NEW YORK.

Letters Patent No. 99,715, dated February 8, 1870.

IMPROVEMENT IN HOSE-COUPLINGS.

The Schedule referred to in these Letters Patent and making part of the same.

*To all whom it may concern:*

Be it known that I, GEORGE SEWELL, of Brooklyn, in the county of Kings, and State of New York, have made a new and useful Hose-Coupling; and I hereby declare the following to be a full and exact description of the same, reference being had to the accompanying drawings, forming part of this specification, in which—

Figures 1 and 2 represent the two parts which make a coupling according to my invention, these parts being exact duplicates the one of the other.

Figure 3 is a longitudinal section of the parts united, and shows the relative positions of the several portions.

Figure 4 is a perspective view of my coupling, the parts being joined and locked.

Hose-couplings, as ordinarily constructed, are made so that the part on one end of the coupling is the counterpart of that on the other, that is, as commonly expressed, the coupling is made up of male and female parts, which are fastened to opposite ends of each length of hose.

This involves a serious inconvenience, sometimes, in joining pieces of hose, since it is necessary to bring the proper ends together, so as to couple.

My invention obviates this difficulty, since both parts of my couplings are exact duplicates the one of the other, as shown in figs. 1 and 2.

Couplings have been made with both male and female flanges on each end, so as to interlock with each other, and couple by being turned; but this is not practical or useful, for the reason that, to join the parts, one or both must be turned, which twists the hose.

My coupling differs from this in construction, since the parts have only to be placed together, and then locked, by turning a collar on each piece, the collar carrying cam-flanges or inclined planes, which engage into grooves on the opposite part, or mate of the coupling, so as to completely lock the parts together, and thus join or couple two or more lengths of hose.

The following description will enable any one skilled in the art to which it relates to make and use my invention.

In the drawings, the same letter represents like parts in all the figures.

I make my coupling of brass, or other suitable metal, such as commonly employed for this purpose.

Each half of the coupling is composed of two pieces, as is shown in fig. 1, in which A is the portion to which the hose is to be attached. This is constructed in the ordinary manner, and need not be further described.

B B are flanged segmental lugs, each occupying one-fourth part of the circumference.

On the inside of each of these projecting lugs are grooves $b\ b$, fitting part A, and immediately behind B B is a collar, C, attached by means of a small pin, $m$, inserted in the part, but so that the collar can turn on the part A.

The collar C is permitted to turn upon the part A by forming a recess or slot on the inside of the collar, as shown at $n$.

The collar C has on its front side, next to B B, two cam-flanges or inclined planes, $c\ c$, occupying one-fourth part of the circumference of the collar.

The flanges are placed exactly opposite to each other on the collar, and when the parts are separated, the flanges $c\ c$ are directly behind the lugs B B.

In figs. 1 and 2, the collars are slightly turned, so as to bring the flanges $c\ c$ partly across the space between the opposite lugs B B.

Each collar has on its own periphery cross-grooves $g\ g$, so as to be grasped and turned by a wrench or tongs, in coupling or uncoupling the hose.

The following is the mode of joining the couplings:

The two parts are brought together, so that the parts B B of fig. 1 pass between the parts B B of fig. 2, as seen in fig. 4.

The collars C C are then turned in opposite directions, so that the cam-flanges $c\ c$ of the collar, on the right-hand side, enter the grooves $b\ b$ of the part B B, on the left-hand side, and the cam-flanges $c\ c$ of the left-hand side enter the grooves $b\ b$ on the part B B, on the right-hand side.

A reverse movement of the collars will unlock and release the coupling.

In locking, it is best to turn both collars, but turning either will answer.

To make the joint between the coupling perfectly tight, a rubber packing may be inserted in the usual manner on the shoulders which join; but if the parts are accurately fitted, they are clamped so closely by the four cam-flanges $c\ c\ c\ c$ in the grooves $b\ b\ b\ b$, that the joint is sufficiently tight, without the use of packing.

I have shown two segmental lugs B B, each occupying one fourth of the circumference, but the same general mode of construction may be used by dividing the circumference into six, eight, or any even number of parts, and having a grooved lug to each alternate space, with corresponding cam-flanges or inclined planes on the collar.

Having thus described my invention,

What I claim, and desire to secure by Letters Patent of the United States, is—

1. A hose-coupling, composed of the portions A B B, with grooves $b\ b$, in combination with the collar C, having cam-flanges or inclined planes $c\ c$, so as to operate as described.

2. A hose-coupling, composed of two parts, duplicates the one of the other, in combination with locking cams or inclined planes, substantially as herein set forth.

GEO. SEWELL.

Witnesses:
CHAS. E. LOOKER,
JOHN A. WALLACE.